United States Patent [19]
Price et al.

[11] 3,910,656
[45] Oct. 7, 1975

[54] SPHERICAL ROLLER BEARING FOR HEAVY LOADS

[75] Inventors: Connor E. Price; Eugene E. Pfaffenberger; William J. Derner, all of Indianapolis, Ind.

[73] Assignee: FMC Corporation, San Jose, Calif.

[22] Filed: Nov. 12, 1973

[21] Appl. No.: 415,184

[52] U.S. Cl. .............................. 308/194; 308/212
[51] Int. Cl.² .......................................... F16C 9/06
[58] Field of Search .......... 308/194, 212, 213, 215, 308/187.2

[56] References Cited
UNITED STATES PATENTS

| | | | |
|---|---|---|---|
| 2,611,669 | 9/1952 | Palmgren | 308/213 |
| 2,642,322 | 6/1953 | Palmgren | 308/212 |
| 3,306,687 | 2/1967 | Smith | 308/213 |
| 3,370,900 | 2/1968 | Messerschmidt | 308/212 |
| 3,572,860 | 3/1971 | Hart | 308/213 |

*Primary Examiner*—M. Henson Wood, Jr.
*Assistant Examiner*—Richard A. Bertsch
*Attorney, Agent, or Firm*—J. F. Verhoeven; C. E. Tripp

[57] ABSTRACT

A self-aligning spherical roller bearing assembly including inner and outer rings, each having a concave curvature of their raceways, and a plurality of barrel shaped rollers therebetween is disclosed. The convexly curved surface of the rollers, which in the central portion of the roller's length has a convex radius of curvature substantially equal to the concave radius of curvature of the mating inner ring raceway, has a modified curvature at each end to increase the normal osculation clearance between the roller and its raceways so as to reduce roller edge loading and the resulting stress concentration at the ends of the roller. The osculation clearance provided is related to the calculated elastic deformation of the roller and raceway in contact under the maximum design load. A method for making the roller is also disclosed.

11 Claims, 8 Drawing Figures

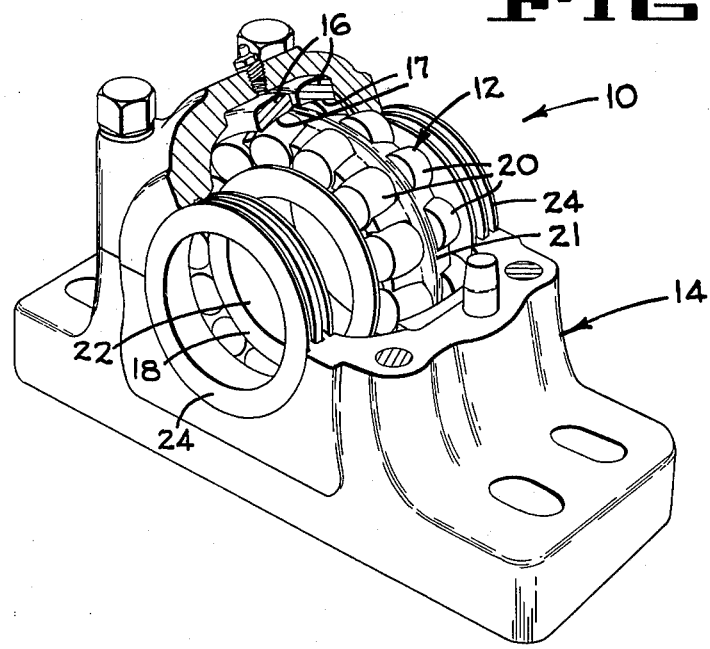
FIG_1
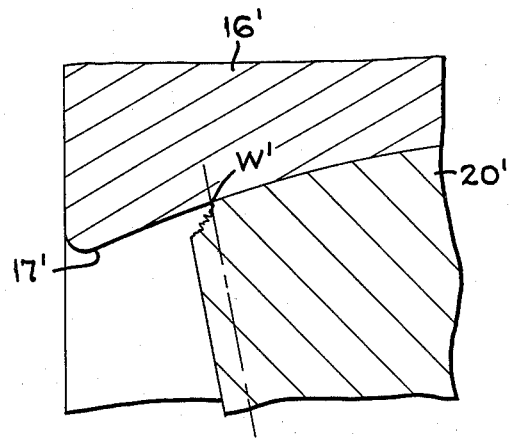
FIG_2
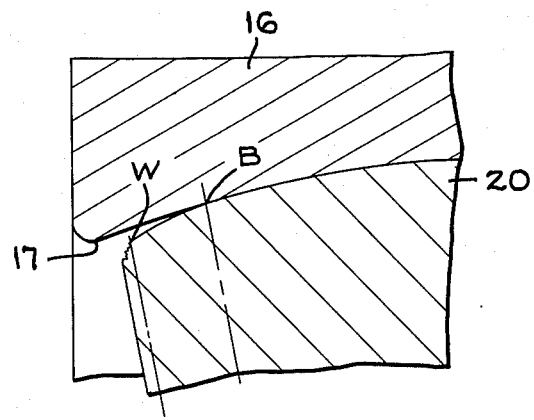
FIG_4
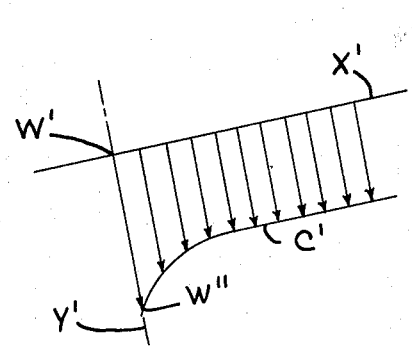
FIG_3
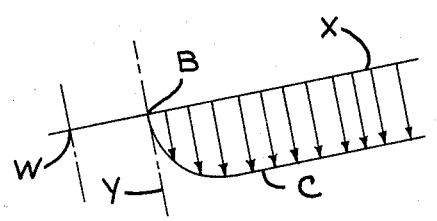
FIG_5

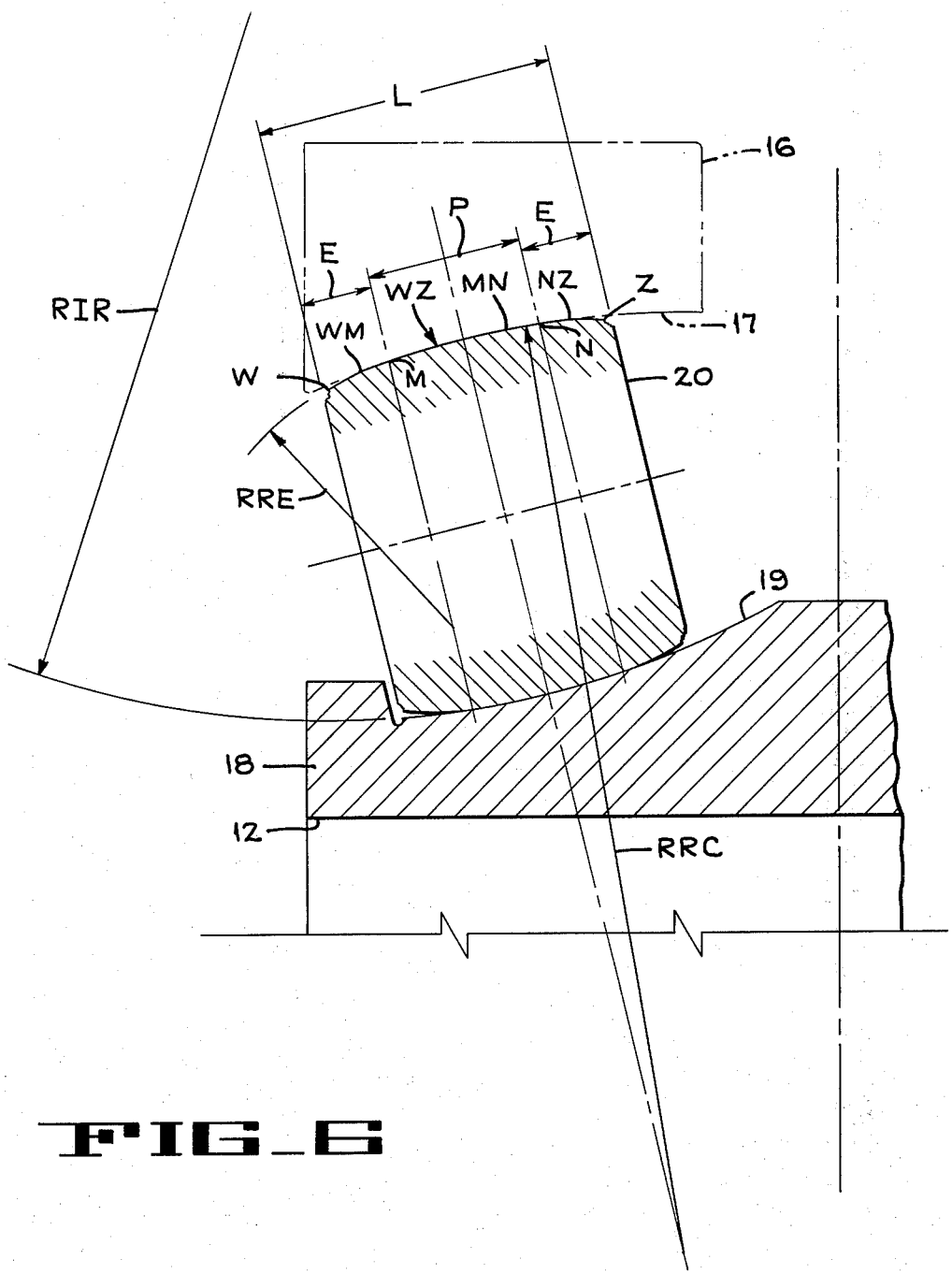
FIG_6

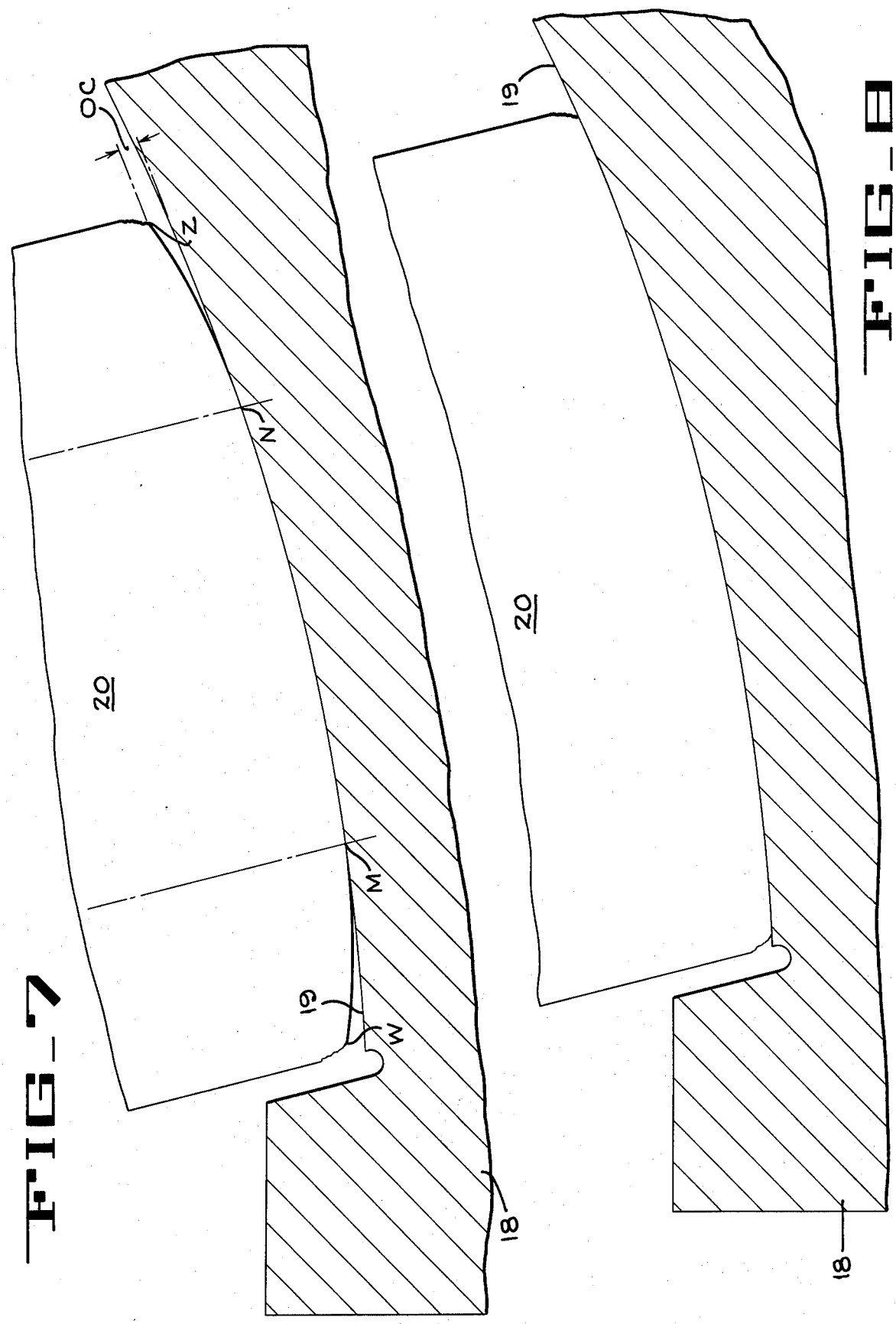

SPHERICAL ROLLER BEARING FOR HEAVY LOADS

BACKGROUND OF THE INVENTION

1. Field of the Invention

This invention relates to the art of anti-friction bearings and more particularly to self-aligning spherical roller bearings having symmetrical barrel-shaped rollers operating between a concavely curved raceway in the outer ring and a concavely curved raceway in the inner ring.

2. Description of the Prior Art

Anti-friction roller bearings with self-aligning features are old in the art as shown by U.S. Pat. Nos. 1,223,592 to D. H. Friend; 1,280,664 to H. C. Clark; 1,350,263 to N. A. Palmgren; 1,447,704 and 1,505,454 to O. R. Wikander; 1,914,548 to S. G. Wingquist; 2,008,336 to N. A. Palmgren; 2,611,669 to P. G. Palmgren and 3,306,687 to R. J. Smith.

The following patents disclose roller bearings using one or more cylindrical raceways in conjunction with a plurality of barrel-shaped rollers; U.S. Pat. Nos. 1,193,019 to F. G. Hughes; 3,370,900 to S. Messerschmidt; 3,572,860 to R. F. Hart; and 3,642,330 to W. G. Newman.

The following patents disclose means to equalize the contact areas in the inner and outer raceways of roller bearings or to avoid injurious concentration of pressure at the ends of the rollers of roller bearings: U.S. Pat. Nos. 1,915,585 to S. G. Wingquist; 1,967,650 to O. W. Ahmansson; 2,082,390 to H. R. Gibbons; 2,142,474 to Langhaar; 2,642,322 to N. A. Palmgren; and 3,370,900 to S. Messerschmidt.

In conventional self-aligning spherical roller bearings used heretofore it has been a common practice to grind the ends of the rollers and the convexly shaped peripheral surface of the rollers, but the corners joining the curved peripheral surface to the ends are left unground. When the bearing is heavily loaded so that contact develops over the entire ground peripheral surface of the roller and its mating raceway, high stress concentrations may develop where the ground surface joins the unground corner at the ends of the roller which might seriously limit the load capacity of the bearing.

It is known in the art that in 1937 Lundberg (G. Lundberg: "Elastische Berhung Zweier Halbraume" Forsch. Ingenieurw., 10, 1939, 201–211) derived an expression for an undeformed profile of a crowned roller which yields, under a given load, a longitudinally uniform and cross-wise semi-elliptical pressure distribution over a rectangular contact area. The Lundberg profile yields a uniform pressure distribution only at one load. Any higher load than the design load induces edge load, and loads lower than the design load cause the contact pressure to be highest at the center of contact.

SUMMARY OF THE INVENTION

In the preferred form of the present invention, in which a self-aligning spherical roller bearing with a concave curvature on the outer and inner ring raceways and a plurality of barrel shaped rollers are used, the convexly shaped contact surface of the roller is modified from a single radius curvature to a continuous curve which will have an increasing rate of change of slope as the ground surface approaches the corner of the roller. The curvature of the roller through the central portion of one-half to three quarters of the roller's length will substantially conform to the concave curvature of the mating raceway, which is a circular arc, but beyond this central portion the curve of the roller surface will have an increasing rate of change of slope (or, at least, an increased rate of change of slope) such that the osculation clearance between the unloaded roller and its mating inner ring raceway at the end of the roller will be an amount in the range of 0.90 to 1.75 times the combined elastic deformation of the roller in contact with its raceway under the maximum design load. This will assure an adequate length of contact at light loads, and will reduce the otherwise high stress concentrations at the end of the roller at heavier loads. Thus, the life and/or reliability of the bearing assembly over a wide range of loads will be improved, and the practical load limit of the bearing assembly will be greatly extended.

It is one object of the present invention to provide a spherical roller bearing assembly in which the rollers will not be subject to early fatigue failure at the ends of the rollers.

It is another object of the invention to provide an improved self-aligning spherical roller bearing assembly wherein the envelope curve of the roller surface is modified at the ends of the roller to eliminate destructive stress concentrations.

It is yet another object of the invention to provide an improved self-aligning spherical roller bearing assembly with a reduced stress at lighter or more normal operating loads which will reflect in improved life and/or increased reliability over a wide range of loads.

It is another object of the invention to provide an improved self-aligning spherical roller bearing assembly with increased practical load limit and the ability to sustain extremely heavy loads.

It is another object of the invention to provide an improved self-aligning spherical roller bearing assembly which is less sensitive to various distorting inaccuracies in mounting and other abuses commonly encountered in bearing applications.

The nature of the invention will become more apparent upon consideration of the figures of the accompanying drawing and the associated description.

BRIEF DESCRIPTION OF THE DRAWINGS

FIG. 1 is a perspective view, partly broken away, of a double row spherical roller bearing pillow block using the unique rollers of the present invention.

FIG. 2 is an enlarged, sectionalized view of a portion of a conventional bearing showing a portion of a conventional roller and its outer bearing ring with its mating raceway.

FIG. 3 is a diagrammatic view showing the unit stress conditions between the roller and its mating raceway of the bearing of FIG. 2 when in contact under load.

FIG. 4 is an enlarged, sectionalized view of a portion of the bearing of FIG. 1 showing the roller of the invention and its outer bearing ring with its mating raceway.

FIG. 5 is a diagrammatic view showing the improved unit stress condition between the roller of FIG. 4 and its mating raceway when in contact under load.

FIG. 6 is an enlarged cross-sectional view of the roller of the invention and a portion of the mating outer and inner bearing rings.

FIG. 7 is a somewhat schematic representation of the roller in contact with the inner race at no load.

FIG. 8 is a view similar to FIG. 7 showing the roller on the inner race at maximum load.

DESCRIPTION OF THE PREFERRED EMBODIMENT

FIG. 1 shows a pillow block bearing 10 having a self-aligning double row spherical bearing assembly 12 mounted in a split housing 14. The double row bearing assembly comprises a pair of outer bearing rings 16 with concave raceways 17, an inner bearing ring 18 (FIG. 6) having a pair of concave raceways 19, a plurality of barrel shaped or convexly crowned rollers 20 mounted between the raceways in two rows, and a pair of bearing cages 21 (omitted in FIG. 6 for clarity) separating the rollers. The inner ring 18 has a bore 22 through which a shaft may be mounted. Shaft seals 24 fit in the outer axial sides of the housing 14. It is to be noted that the present invention applies equally well to a spherical roller bearing having a single row of rollers and mating raceways in lieu of the double row of rollers shown, and also to double row bearings having a one-piece outer ring in lieu of the separate outer rings shown.

In the conventional bearing, as illustrated in FIG. 2, the envelope of the convexly shaped rollers 20' closely conforms to the concave curve 17' of the outer raceway 16' and inner raceway (not shown), and is a ground curved surface of a single radius up to a point closely adjacent each end of the roller. The roller corner joining the ground surface and the ends of the roller has commonly been left unground and without a defined blending radius; often only a chamfer is formed on the rough roller before it is finished. It has been found that under an excessive load, contact will develop over the entire ground length of the rollers and seriously high stress concentrations will occur where the ground roller surface joins the unground corner surface. The stress concentration of the roller of FIG. 2 is indicated in FIG. 3, where the abscissa X' represents the axial position along the roller and the ordinate Y' represents the magnitude of the stress. At corner W' of the roller 20', the magnitude of the stress is indicated by the distance of point W'' on FIG. 3 from the abscissa X', and the curve C' indicates the stress along the length of the roller.

Osculation occurs when two smooth curved surfaces touch. Osculation clearance, as used herein in reference to bearings, is defined as the clearance existing between the convexly curved roller surface and the concavely curved raceway at the ends of the roller. The osculation clearance OC is shown at no load in FIG. 7, and the term osculation clearance as used herein will refer to the clearance at no load unless otherwise indicated or specified. An osculation clearance is maximum at no load and then decreases as load is applied. The osculation clearance will be completely lost when the load reaches a specific high value, depending on the exact geometry of the parts in contact. This clearance is closely controlled by limiting manufacturing tolerances on the parts involved in high quality bearings of this type.

It has been discovered that when the osculation clearance (OC, FIG. 7) at the end of the rollers is related to the combined elastic deformation of the two bodies in contact under the maximum design load, the possibility of edge loading and of high stress concentrations at the end of the roller can be eliminated. This, then, permits the practical load limit of the bearing assembly to be greatly extended and to improve the reliability and/or life of the bearing assembly over a wide range of loads.

FIG. 4 shows an enlarged sectionalized view of a portion of the bearing of FIG. 1 with the profile of the roller 20 and its mating outer ring raceway 17 according to the present invention. The bearing of FIG. 4 is shown under a load corresponding to the maximum design load but the entire length of the bearing is not engaged with the race 17 because the initial osculation clearance was greater (say 1.25 times) than the combined elastic deformation of the roller and the race. FIG. 5 is a diagrammatic stress diagram of the bearing of FIG. 4, with an abscissa X representing the axial position on the roller and an ordinate Y representing the magnitude of the stress. Curve C indicates the value of the stress along the length of the bearing. The diagram of FIG. 5 shows that the stress at end point W of the roller is zero, and that stress in the roller surface does not begin until an intermediate point B.

In an optimized design, the osculation clearance, OC, at the end of the rollers at no load is held within a range of 0.90 to 1.75 times the combined elastic deformation of the two bodies under the maximum design load. Since the inner ring raceway contact with the roller is normally more critical than the outer ring raceway contact with the roller, the osculation clearance referred to above is the clearance measured at the inner bearing ring raceway. It will be noted that if, at no load, the osculation clearance OC is 1.0 times the combined elastic deformation of the two bodies under the maximum design load, the two bodies (that is, the race and the roller) will be in contact at end points W and Z but there will be no stress in the roller at these points. If the osculation clearance is less than 1.0 times the combined elastic deformation of the two bodies at maximum design load, the bodies will be in contact with a small amount of stress at the end points. If the osculation clearance is greater than 1.0 times the combined elastic deformation of the bodies at the end points W and Z of the roller under the maximum design load, the two bodies will not make contact at points W and Z (see FIG. 4), and the stress in the roller at the ends will be zero. The curvature of the roller envelope of this improved roller at no load is defined as a continuous curve WZ (FIG. 6) extending the full length L of the roller and containing the intermediate points M and N.

The central portion MN (extending between points M and N) of the curve substantially coincides with the radius of curvature of the mating raceway, which is substantially a circular arc. End portions WM and NZ have an increased rate of change of slope from the points M and N to the points W and Z, respectively, of roller 20. The rate of change of slope of curve WZ in the end portions WM and NZ may be substantially constant (although greater than in central portion MN) or increasing over the span E from points M to W and N to Z. In any event, the curve WZ should be continuous without abrupt changes. The central portion MN has a width P within the range of 0.50 to 0.75 times the longitudinal length L parallel to the rollers rotational axis.

Stated another way, at no load, the race 17 is circular with a radius RRC (FIG. 6) over the entire span L of the roller 20. The roller, at no load, has a central surface portion MN with a radius RRC equal to the radius of the race, and has end portions WM and NZ with a radius RRE less than radius RRC, or with a radius of curvature RRE diminishing progressively outwardly from the ends M and N of the central portion of the roller to the far ends W and Z of the roller. Under maximum design load (and assuming that the osculation clearance is equal to the combined elastic deflection of the roller and race) the elastically deflected radius of the roller and the elastically deflected radius of the race will be the same over the entire span L, as shown in FIG. 8.

It is to be noted that the Lundberg profile of a crowned roller, previously referred to, produces highest contact pressures at the center of the roller under loads lower than the design load. This condition indicates that there is a difference between the radius of the mating concave raceway and the convex radius of the roller at the latter's central portion so that line contact does not occur.

In the improved roller of the present invention, the radius RRC (FIG. 6) of the convex profile of the roller in the central portion between points M and N is substantially the same (both at no load and at maximum load) as the concave radius RIR of the mating inner ring raceway. Since the roller central portion MN of the curve WZ, over the central span P, is substantially circular, as is the race over the entire span L, essentially line contact in profile over the central portion MN of the roller will result under a wide range of loads. At lower than design loads, the roller disclosed herein will have a larger contact area, and therefore a reduced high pressure area in the center, than the Lundberg roller.

Between the central portion MN and the ends W and Z of the roller (that is, over the spans E), the portions WM and NZ of the curve WZ provide a predetermined osculation clearance in the unloaded state (FIG. 7) at the ends of the rollers. At the maximum design load (FIG. 8) contact over the full length of the roller is obtained (if the osculation clearance OC is equal to or less than the combined elastic deformation of the roller and race at the ends of the roller), and thus better and more uniform load distribution (FIG. 5) without edge loading and its usual high stress concentration (FIG. 3) is obtained. Since the profile of the roller 20 is based on the combined elastic deformation of the roller and raceway in contact under the maximum design load, no edge loading, or only a small edge loading, will occur under any load the bearing should be expected to carry.

Considering a typical example of a conventional type 22216LB spherical roller bearing, the outer bearing ring of this example has an outside diameter of 5.5118 inches, an overall length of 1.2972 inches, a spherical radius of the outer ring raceway of 2.4976 inches and a maximum internal diameter at the center of the raceway of 4.9952 inches. The inner bearing ring has a bore of 3.1496 inches, two concave inner raceways having a radius of 2.4976 inches, a minimum diagonal diameter across the bottom of the two raceways of 3.8656 inches along an axis disposed 8°59' from the vertical centerline and an overall width of 1.2972 inches. The rollers have an overall length of 0.4779 inch, a maximum diameter at the vertical centerline of 0.5628 inch and a convex radius of the outer curved surface of 2.3898 inches.

Approximate values of the conventional and the present bearings will better illustrate the improvement which the present invention provides over the capability of the conventional bearing assembly. If a maximum design load of 20,000 pounds is used, which is beyond the capability of this conventional bearing assembly, the combined elastic deformation of the conventional roller in contact with the inner bearing ring raceway would be approximately 0.0010 inch and a theoretical Hertz stress of 336,000 p.s.i. would result. Moreover, this bearing assembly would actually have serious stress concentrations due to edge loading of the roller (FIG. 3). For comparison at a lesser operating load of say 2250 pounds, this conventional bearing would have a combined elastic deformation of the two bodies in contact on the inner ring raceway of approximately 0.00023 inch and a theoretical Hertz stress of about 162,000 p.s.i.

The improved roller according to the present invention (FIGS. 4 to 8) would have a combined elastic deformation in contact with the inner ring raceway of about 0.0008 inch under the 20,000 pound load. According to the optimum design criteria previously mentioned, the osculation clearance OC at the end of the roller and the inner ring raceway, using the aforementioned multiplier range of 0.90 to 1.75, would then be 0.0007 inch to 0.0014 inch. This would result in a theoretical Hertz stress of the two bodies in contact of 250,000 p.s.i. with no stress concentrations (FIG. 5). Further, this invention would permit this bearing to sustain loads over the entire range of 0 to 20,000 pounds with an optimized and most favorable stress distribution not possible with profiles falling outside of the described envelope. When operating under a load of only 2250 pounds, the improved bearing assembly of this invention would have a maximum combined elastic deformation at the inner ring contact of 0.00017 inch and a Hertz stress of about 130,000 p.s.i. Thus, this improved bearing provides not only an improved ability to sustain extremely heavy loads but also provides a reduced stress at lighter or more normal operating loads which will reflect in improved life and/or increased reliability.

The described curvature of the envelope of the improved roller surface does not lend itself to a single, simple mathematical expression which is suitable for all sizes of bearing assemblies. Instead, a curve for each size of bearing assembly is determined from the elastic behavior of the particular combination of elements within that bearing assembly under the loading conditions for which it is designed. The important coordinates of a curve to satisfy the optimization of the desired osculation clearance can then be calculated for each bearing assembly. This curve can include, but is not limited to, a curve having a single radius RRE (FIG. 6) on the ends of the roller 20, which curve is blended into the tangent, at points M or N, to the curve having a radius RRC in the central portion of the roller. The roller curve also passes through the calculated coordinates for the desired osculation clearance OC at points W or Z respectively. For the roller of the example, the normal convex radius RRC of the roller through the central portion P of the roller, or for a range in width of 0.2389 to 0.3584 inch, has a value of 2.4976 inch, the curvature of the races in the rings. The curve for the roller ends WM and NZ can be a curve having a varying radius tangent at points M or N respectively at the ends of the central portion of the roller, or it can have a single radius RRE which blends with curve MN at points M and N. Either curve would also pass through the calculated coordinates which provide for the desired unloaded osculation clearance OC in the range of 0.0007 to 0.0014 inch at the ends of the roller, points W or Z respectively.

In the method of manufacture of the improved roller for the spherical roller bearing of the invention, the combined elastic deformation of the roller contacting its mating inner ring raceway under the maximum design load of the bearing is first determined. Then the desired range of osculation clearance between the ends of the roller in the unloaded state and the inner ring raceway is determined as 0.90 to 1.75 times the above determined combined elastic deformation. The coordinates defining a continuous smooth curve for the convex profile of the roller in the unloaded state are established next. This curve WZ of the profile is tangent to the convex radius of the roller in the central portion. At the end portions of the roller, this curve passes through points determined by the selected osculation clearance. The axial extent P of the central portion of the roller is selected as equaling 0.50 to 0.75 times the longitudinal length of the roller, and is symmetrical about the longitudinal center of the roller. The convex radius RRC of the roller curvature within the central portion is defined as substantially equal to the concave radius of curvature of the inner ring raceway 19. The curvature of this roller profile curve WM, NZ at the two end portions of the roller preferably progressively increases in slope from the central portion toward the ends of the roller. The roller is rough machined to approximate size from conventional bearing steel, such as an A.S.T.M. 52100 type of steel. The roller is then heat-treated to a hardness within the range of ROCKWELL "C" 60–62. A grinding wheel is dressed to a concave curvature which is a duplicate of the desired continuous smooth curve of the convex profile of the roller. Using a plunge grinding technique, the heat-treated roller is then finished ground to the desired convex profile using the dressed grinding wheel. The convex profile of the finished ground roller can be checked by suitable tracing equipment to obtain verification of the desired profile.

Although the best mode contemplated for carrying out the present invention has been shown and described, it will be apparent that modification and variation may be made without departing from what is regarded to be the subject matter of the invention.

What is claimed is:

1. In a spherical roller bearing assembly having an outer bearing ring with a concavely curved raceway, an inner bearing ring with a concavely curved raceway, a plurality of spaced convexly crowned rollers mounted between the outer and inner rings and a cage separating the rollers circumferentially, the improvement which comprises said rollers having a continuous smooth curve generating an improved convexly crowned outer contact surface envelope as the roller rolls about its longitudinal axis, said smooth curve having a central portion of the roller's axial length with a convex radius substantially equal to the concave radius of the mating inner ring raceway and having end portions of decreased radius of curvature adjacent the longitudinal ends of the rollers, which end portions provide a predetermined osculation clearance between the roller and its mating raceway when unloaded which is proportional to the combined elastic deformation of the roller in contact with its mating raceway under the maximum design load of the bearing assembly, whereby high stress concentrations at the ends of the rollers are eliminated, the life and reliability of the bearing assembly over a wide range of loads are improved and the practical load limit of the bearing assembly is increased.

2. The roller bearing assembly of claim 1, wherein said central portion of said continuous smooth curve of said rollers has an axial extent falling within the range of 0.50 to 0.75 of the longitudinal length of the roller.

3. The roller bearing assembly of claim 1 wherein the predetermined osculation clearance is defined as falling within a range of 0.90 to 1.75 times the combined elastic deformation of the roller in contact with the raceway of the inner bearing ring under the maximum design load on the bearing assembly.

4. An improved roller for a spherical roller bearing assembly having an outer bearing ring with a concavely curved raceway, an inner bearing ring with a concavely curved raceway, a roller cage, a plurality of said improved rollers being assembled between the outer and inner rings and being separated circumferentially along the raceways by the cage, said improved roller comprising a barrel shaped roller having a convexly curved outer surface envelope generated by a continuous smooth curve as the roller rolls about its longitudinal axis, said smooth curve having a central portion having an axial extent within a range of 0.50 to 0.75 of the longitudinal length of the roller and having substantially the same radius of convex curvature as the radius of the mating concave raceway, said smooth curve having end portions connecting said central portion with each longitudinal end of the roller, said end portions providing a predetermined osculation clearance between the ends of the roller and its mating raceway when unloaded in proportion to the combined elastic deformation of the roller in contact with its mating raceway under the maximum design load of the bearing assembly.

5. The improved roller of claim 4 wherein said predetermined osculation clearance falls within a range of 0.90 to 1.75 times the combined elastic deformation of the roller in contact with the raceway of the inner bearing ring under the maximum design load of the bearing assembly.

6. The improved roller of claim 4 wherein said end portions of said continuous smooth curve have an increasing rate of change of slope from said central portion toward the ends of the roller permitting said predetermined osculation clearance.

7. In a double row self-aligning spherical roller bearing assembly having a pair of outer bearing rings each with a concavely curved raceway, an inner bearing ring having a pair of concavely curved raceways, a plurality of spaced, convexly crowned rollers mounted between the outer and inner rings in each of the two sets of mating raceways, and a pair of bearing cages separating the rollers in each row, the improvement which comprises each roller having an improved convexly curved outer contact surface envelope generated by a continuous smooth curve as the roller rolls about its longitudinal axis, said smooth curve having end portions adjacent the longitudinal ends of the roller which provide a predetermined osculation clearance between the roller and its mating raceway when unloaded in proportion to the combined elastic deformation of the roller in contact with its mating raceway under the maximum design load of the bearing assembly and having an axially extending central portion falling within a range of 0.50 to 0.75 of the longitudinal length of the roller, and said central portion having a radius of curvature substantially equal to the radius of the concavely curved raceway of the mating raceway.

8. The double row bearing assembly of claim 7 wherein said end portions of said curve of the improved convexly curved outer surface envelope have an increasing rate of change of slope toward the ends of the roller where said predetermined osculation clearance is provided.

9. The double row bearing assembly of claim 8 wherein said predetermined osculation clearance falls within a range of 0.90 to 1.75 times the combined elastic deformation of the roller in contact with the inner ring raceway under the maximum design load of the bearing assembly.

10. In a spherical roller bearing assembly having an outer bearing ring with a concavely curved raceway, an inner bearing ring with a concavely curved raceway, a plurality of spaced convexly crowned rollers mounted between the outer and inner rings, the improvement wherein said rollers have a continuous smooth curve generating a convexly crowned outer contact surface envelope as the roller rolls about its longitudinal axis, said smooth curve having a central portion of the roller's axial length formed with a convex radius substantially equal to the concave radius of the mating inner ring raceway and having end portions of decreased radius of curvature adjacent the longitudinal ends of the rollers, said end portions providing an osculation clearance between the roller and its mating raceway when the bearing is unloaded, whereby high stress concentrations at the ends of the rollers are eliminated when the bearing is loaded, and the practical load limit of the bearing assembly is increased.

11. The roller bearing of claim 10 wherein the osculation clearance when the bearing is unloaded is within a range of 0.90 to 1.75 times the combined elastic deformation of the roller and the raceway of the inner bearing ring under the maximum design load of the bearing assembly.

* * * * *

UNITED STATES PATENT OFFICE
CERTIFICATE OF CORRECTION

PATENT NO. : 3,910,656
DATED : October 7, 1975
INVENTOR(S) : PRICE et al

It is certified that error appears in the above-identified patent and that said Letters Patent are hereby corrected as shown below:

Column 1, line 15, delete "1,223,592" and substitute therefor --1,223,952--.

Column 8, line 18, "on" should read -- of --.

Signed and Sealed this eleventh Day of May 1976

[SEAL]

Attest:

RUTH C. MASON
Attesting Officer

C. MARSHALL DANN
Commissioner of Patents and Trademarks